July 17, 1934.  W. F. PETERSEN ET AL  1,966,681
DOUGH TANK
Filed Jan. 30, 1933   2 Sheets-Sheet 1
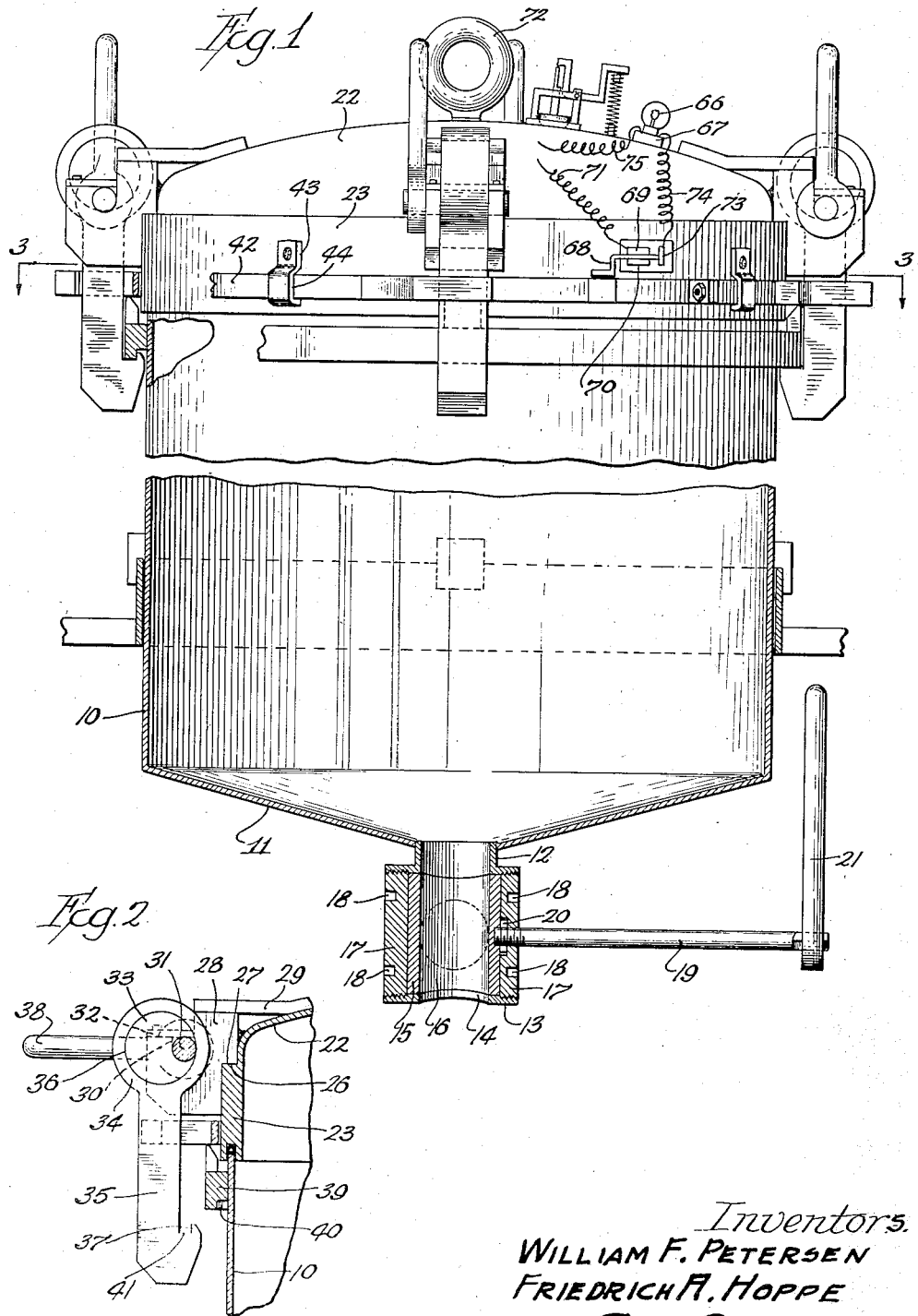
Inventors.
WILLIAM F. PETERSEN
FRIEDRICH A. HOPPE July 17, 1934.   W. F. PETERSEN ET AL   1,966,681
DOUGH TANK
Filed Jan. 30, 1933   2 Sheets-Sheet 2
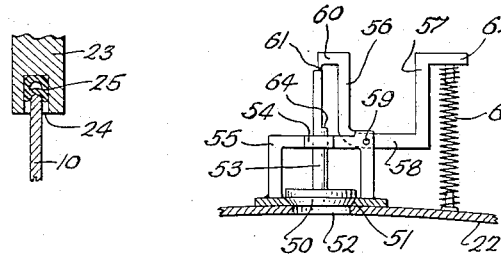
Inventors
WILLIAM F. PETERSEN
FRIEDRICH A. HOPPE Patented July 17, 1934

1,966,681

UNITED STATES PATENT OFFICE 1,966,681

DOUGH TANK

William F. Petersen and Friedrich A. Hoppe, Chicago, Ill., assignors to Schmidt Securities Company, Chicago, Ill., a corporation of Illinois Application January 30, 1933, Serial No. 654,278

7 Claims. (Cl. 220—55)

This invention relates to a receptacle for dough for bread and similar bakery products. The invention, more specifically stated, relates to a tank in which dough may be fermented under pressure and from which the dough may be removed after the fermentation stage or step has been completed.

It has been found that when bread dough and the like is fermented in a closed and sealed container the pressure created by the fermentation gradually increases as the fermentation proceeds, and that, at the conclusion of the fermentation, the pressure in the container is so high that extreme care must be exercised in removing the dough from the tank or removing the lid or closure from the top of the tank.

It is the purpose of this invention to devise a tank that is provided with safety appliances whereby the closure element will not only be locked against accidental removal but will also seal the tank so that the fermentation gases or created pressure within the tank will not escape therefrom between the top of the tank and its closure. Means are provided in the structure herein disclosed for quickly and effectively clamping the closure tightly against the top edge of the tank by a compressive action that is created through the medium of cam devices, and means are also provided which will securely lock these cam devices against accidental and unintentional release. Means are also devised for relieving the pressure within the tank whenever desired or at predetermined times.

Numerous objects have been in mind in designing this structure, among which may be mentioned the fact that the means for clamping the closure on the tank are readily operated and are highly effective in performing the functions for which they have been devised. The locking element is easily operated and when it locks the clamps the latter are incapable of being disturbed. The apparatus is simple in construction and is comparatively economical to manufacture, and its parts are of sturdy construction so that they will withstand severe usage.

It is preferred to carry out this invention and to accomplish the numerous objects thereof in substantially the manner hereinafter fully described and as more specifically pointed out in the claims, reference being herein made to the accompanying drawings that form a part of this specification.

In the drawings:

Figure 1 is a view of a dough tank made in accordance with this invention with portions thereof broken away and with the clamping and locking devices shown in elevation and in a clamped and locked position.

Figure 2 is a view showing the relative positions of the parts when the clamping and locking elements are released to remove the cover or closure.

Figure 3 is a horizontal transverse section taken on line 3—3 of Figure 1 showing the construction and mode of operating the locking structure in conjunction with the clamping elements.

Figure 4 is a view in section showing the manner of mounting the closure upon the tank and sealing the same against the escape of air and gas, the view being drawn to a larger scale.

Figure 5 is a view in detail of the relief valve and trigger mechanism.

It will be understood that the drawings are more or less schematic and are for the purpose of disclosing a typical or preferred form in which the invention may be made; and in these drawings like reference characters are used to designate like parts wherever they appear in the different views.

Referring at first to Figure 1, it will be seen the tank is in the form of a hollow receptacle having a cylindrical side wall 10 and having tapered or hopper-shaped bottom 11, and in the center of the latter there is a discharge opening or outlet port into which a cylindrical discharge sleeve 12 is fitted and arranged with its axis vertical and in alinement with the axis of the tank. At the lower end of the sleeve there is a cylindrical housing 13 that is disposed with its axis horizontal or transverse to the axis of the discharge sleeve 12 and has a discharge opening 14 in its bottom alining with the discharge sleeve 12.

A valve body 15 is rotatably fitted into the housing 13 and has a transverse bore or passageway 16 through which the contents of the tank are discharged when the valve is opened. The valve body is maintained in the housing 13 by means of end plugs 17, 17, that have threaded edges whereby they may be screwed into the threaded inner surfaces of the housing 13 when the plugs are rotated by means of a spanner wrench inserted into the pockets 18. A valve rotating rod 19 is welded into the valve body in the manner shown at 20 and is thus maintained against independent rotation. Said valve rotating spindle passes through the adjacent end plug and has its outer end provided with an operating handle 21 whereby movement of the handle in one direction or the other will rotate the valve to open or close the discharge port when desired.

The lid or closure for the top of the tank comprises a preferably dome-shaped cover 22, the edges of which bend or curve downwardly and are thickened to provide a heavy cylindrical base side wall 23. The lower or bottom edge of the side wall is provided with an annular recess 24 into the bottom of which a gasket 25 is inserted and seated. The gasket is preferably in the form of a tube of rubber or the like and has a central air chamber so that, when the closure is in position upon the cylindrical wall of the tank, the upper edge of said cylindrical wall will press into the rubber gasket causing it to spread and fill the space in the channel 24. The central bore of the tube, which contains air will act as a compressible cushion to prevent collapse of the tube and thereby assist in sealing the tank against escape of air or gas between the top edge of the body of the tank and the base of the closure.

In sealing the tank it is preferred to draw the closure down firmly upon the upper edge of the tank body or cylindrical wall 10, and, to do this effectively, the following described structure has been devised. The thickened cylindrical wall or base 23 of the closure provides an exterior shoulder 26 upon its upper outer edge that affords a seat for the correspondingly shaped shoulder 27 of a heavy bracket 28. The bracket is of irregular shape and extends down below the shoulder 26 and also upwardly therefrom in the manner shown in Figures 1 and 2, and said bracket may be secured to the heavy base 23 of the closure by welding it to the base or in any other suitable manner. Said bracket also is braced by a stay-bar 29 that is secured to the upper end of the bracket and extends over onto and is secured to the cone-shaped portion of the closure in the manner shown.

The upper portion of the bracket 28 is stepped down slightly as shown and it is provided with a horizontally disposed bearing 30 for rotatably mounting the trunnions 31. A retainer plate 32 is secured on the top face of the stepped portion and extends over the bearing 30 and the trunnions 31 to maintain the latter in the bearing. The trunnions are a part of a circular cam block 33 and are disposed so that their axes are eccentric to the axis of the block.

The cam block just mentioned is surrounded by an enlargement or head 34 upon the upper portion of a clamping hook 35 that hangs pendent from the cam block in the manner shown in Figures 1 and 2, said head being provided with a horizontal bore 36 in which the cam block may rotate to operate the clamping element.

The lower portion of the clamping hook 35 is provided with an upwardly extending lug 37 that is spaced from the adjacent portion of the body of the clamping hook upon the side thereof that is nearest the tank. One trunnion 31 extends out of its bearing on one side of the bracket 28 and has an operating handle 38 secured to it so that movement of the handle in an up and down direction will rotate the cam block and thereby move the pendent hook.

It will be obvious, by reference to Figures 1 and 2 that when the handle is moved from the horizontal position shown in Figure 2 to the upward position shown in Figure 1 the lower end of the hook will travel in an upward direction and also in a lateral direction toward the adjacent wall of the tank.

In order to provide engagement for the lug 37 of the hook a heavy bank 39 is fixedly secured to the exterior surface of the tank wall 10 adjacent the upper edge of the latter and said band is provided with a recess 40 in its lower edge which may extend inwardly toward the tank wall 10 in the manner shown in Figures 1 and 2. The recess 40 is of sufficient depth to accommodate the lug 37 on the hook and the horizontal portion or shoulder between the lug and the vertical body portion of the hook, which is indicated by the numeral 41, will engage the bottom edge of the band 39 outside the recess.

When the closure has been placed upon the tank body and the handle 38 of the clamp hook is moved upwardly, from a horizontal position to a vertical position, the lower end of the hook will travel toward the lower edge of the band 39 and the shoulder 41 of the hook will engage with the lower edge of the ring as before described and continued movement of the handle 38 will cause the structure to draw the closure tightly against the tank wall and compress the gasket 25 in the lower edge of the closure base. When the parts have reached a fully clamped position it will be seen the lug 37 has entered the recess 40, as shown in Figure 1, and prevents the hook from being swung laterally away from the tank.

For the purpose of clearness and to avoid confusion in terminology only one clamping structure has been described but it will be understood that there are several of these clamping structures on the closure element, four of which have been shown in the drawings. It will also be obvious that the number of clamp structures may be increased or diminished according to the necessary requirements.

In order to insure further safety and to prevent accidental or unintentional opening of the tank after it has been closed and especially while there is pressure within it, an auxiliary locking device has been devised. The locking device just mentioned consists of a movable ring 42 that encircles the heavy base wall 23 of the closure and is maintained in operative position by means of metal clips or guides 43 that are secured to the exterior of the cover base wall and are formed with off-set U-shaped portions 44 that provide guides in which the ring 42 may slide.

The ring is made in preferably two semicircular pieces with their ends bent laterally as at 44 to provide lugs through which fastening bolts 45 are passed. It will be obvious that, in order to increase the diameter of the ring, washers or shims may be inserted between the lugs on either or both sides of the ring.

The ring is provided with a laterally disposed handle 46 by which it may be moved in a horizontal direction as indicated in Figure 3. The ring is provided at spaced points with irregular-shaped lock elements. The base portions 47 of the elements are anchored on the ring at spaced intervals corresponding with the respective positions of the clamping hook, and the remaining portions of these elements are in the form of L-shaped extensions that project from the ring. The lateral arms 48 of these L-shaped extensions project radially away from the ring so that when the strap is rotated these lateral arms will engage the sides of the clamping hooks 35. The other arms 49 of these extensions are disposed laterally to the radial arms 48 and are disposed substantially concentric with the ring so that they will extend outside of but close to the outer faces of the clamping hooks.

When it is desired to lock the hooks against lateral movement the handle 46 is moved to the position shown in full lines in Figure 3 which causes the radially disposed lateral arms 48 of the locking devices to abut the respective sides of the hook bodies and the other or outer arms 49 of the locking devices will be disposed outside of or in front of the respective hook bodies.

Since the hooks must move outwardly as well as downwardly to release the closure from the top of the tank the locking device just described will prevent such movement when they are in the positions shown in full lines in Figure 3. However, the locking device may be released by a reverse movement of the handle 46 which slides the ring in the opposite direction and positions the outer arms 49 out of the normal path of movement of the clamping hooks so that the latter may be released from the tank.

A relief valve is provided in the upper portion of the closure. This may be in the form of a mushroom valve 50 that fits into a tapered reamed seat 51 surrounding an outlet opening 52 in the dome of the closure. The spindle 53 of the valve extends upwardly and passes through a guide boss 54 arranged in the center of a bridge 55 that is secured to the top of the closure. A trigger device maintains the valve in closed position as shown in Figure 5. The trigger device consists of a U-shaped metal piece the parallel arms 56 and 57 of which project upwardly, while the connecting arm 58, which is disposed substantially horizontal is pivotally mounted on the bridge by means of a pintle 59. The upper end of arm 56 of the trigger is provided with a lateral extension 60 that has a downward projecting narrow lug 61 to engage the upper end of the spindle 53, and the arm 57 has a lateral extension 62 between which and the closure 22 there is an expansion spring 63 to normally urge the trigger towards the upper end of the valve spindle. The portion of the valve spindle above the guide is reduced by cutting away approximately one-half of the upper portion that is next to the trigger arm 56, thus leaving a shoulder 64 on the spindle just above the guide 54.

A further safety device which has been provided in this structure is in the form of a visible signal. This consists of a small electric bulb 66 mounted in a conventional socket 67 upon any convenient portion of the cover or may be suspended in some convenient location in the room. A movable switch contact 68 of substantially L-shape is secured upon the sliding ring 42 in such manner that its free arm, which is substantially parallel to the ring will pass between spaced metal blocks 69 and 70 mounted on an insulation plate on the cover. The upper block 69, has a conductor wire 71 connected to it that leads up over the tank cover to the eye 72, by which the cover is lifted and suspended, and thence to a source of current supply. Opposite the slot or opening between the blocks 69 and 70 is a second stationary contact 73 against which the end of the movable contact arm will engage. A conductor 74 leads from the contact 73 to the socket and another conductor 75 leads from the socket to the source of current supply after said conductor passes with the eye 72. The disposition of the contacts is such that when the locking devices are in the position shown in Figures 1 and 3 the switch will be turned on and the circuit formed to illuminate the bulb. Any reverse movement of the ring 42 will break the circuit and extinguish the light thereby signaling the fact that the locking devices have been moved from their normal locking position.

What is claimed is:—

1. A device of the kind described comprising a hollow tank, a closure fitted to the top thereof, and means for securing said closure in assembly with said tank, said means consisting of an annular grooved band secured to said tank adjacent said closure, a plurality of members suspended pendent from said closure and having lateral and upstanding portions to engage said band and recess, cam blocks rotatably mounted on said closure and operatively connected with said pendent members for moving the latter upwardly and inwardly to said band, and a plurality of lock devices movable to positions relative to said pendent members whereby to prevent downward and outward movement of said pendent members after engagement with said band.

2. A device of the kind described comprising a hollow tank, a closure fitted to the top thereof, and means for securing said closure in assembly with said tank, said means consisting of a plurality of cam blocks rotatably mounted on said closure, a band secured to said tank below the closure, clamp members extending between said blocks and band and adapted to be moved into clamping engagement with the band by the rotation of said cam blocks, and lock elements adapted to be engaged with said clamp members and lock the latter against movement.

3. A device of the kind described comprising a hollow tank, a closure fitted to the top thereof, and means for securing said closure in assembly with said tank, said means consisting of a plurality of cam blocks rotatably mounted on said closure, a band secured to said tank below the closure, clamp members extending between said blocks and band and adapted to be moved into clamping engagement with the band by the rotation of said cam blocks, a ring rotatable concentrically with respect to the tank and closure, and lock elements moved by said ring into engagement with said clamp members to retain the latter against movement.

4. A device of the kind described comprising a hollow tank, a closure fitted to the top thereof, and means for securing said closure in assembly with said tank, said means consisting of a plurality of cam blocks rotatably mounted on said closure, a band secured to said tank below the closure, clamp members extending between said blocks and band and adapted to be moved into clamping engagement with the band by the rotation of said cam blocks, a ring rotatable concentrically with respect to the tank and closure, and lock elements mounted on said ring and moved therewith into engagement with said clamp members to retain the latter against movement.

5. A device of the kind described comprising a suitable open receptacle, a closure fitted to the open portion of said receptacle, a plurality of clamp members carried by said closure, eccentrically operable elements on which said members are pendently mounted, and by which said members are moved to clamping positions, means on said receptacle engaged by said members when the latter are in clamping positions, and a plurality of separate lock elements movable annularly upon the device to individually engage the respective clamp members and maintain the latter against accidental movement.

6. A device of the kind described comprising a suitable open receptacle, a closure fitted to the open portion of said receptacle, a plurality of clamp members carried by said closure, eccentrically operable elements on which said members are pendently mounted, and by which said members are moved to clamping positions, means on said receptacle engaged by said members when the latter are in clamping positions, a ring encircling the device adjacent said clamp members and movable concentric to the receptacle and closure, and lock elements on said ring to engage said clamp members and prevent accidental movement of the latter.

7. A device of the kind described comprising a suitable open receptacle, a closure fitted to the open portion of said receptacle, a plurality of clamp members carried by said closure, eccentrically operable elements on which said members are pendently mounted, and by which said members are moved to clamping positions, means on said receptacle engaged by said members when the latter are in clamping positions, a ring extending around and movably mounted on said closure adjacent said clamp members, and lock elements on said ring to engage said clamp members and prevent accidental movement of the latter.

WILLIAM F. PETERSEN.
FRIEDRICH A. HOPPE.